Jan. 11, 1955     F. LYIJYNEN ET AL     2,699,416
TRIM PANEL AND METHOD OF MAKING THE SAME
Filed Feb. 21, 1952     2 Sheets-Sheet 2

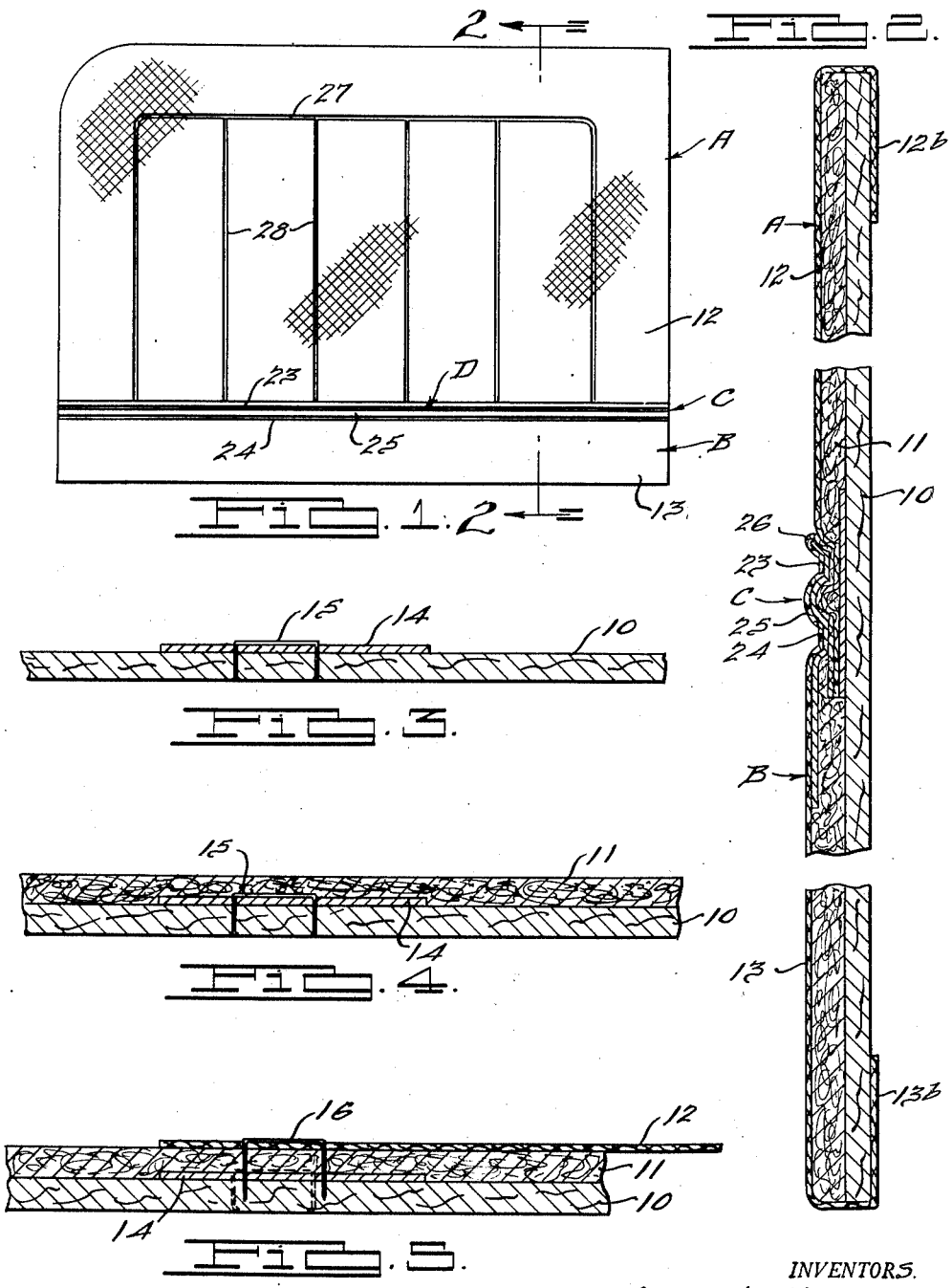

INVENTORS.
Fred Lyijynen,
Alvin W. France.
BY Elmer Jamison Gray
ATTORNEY.

United States Patent Office 2,699,416
Patented Jan. 11, 1955

2,699,416

TRIM PANEL AND METHOD OF MAKING THE SAME

Fred Lyijynen and Alvin W. Prance, Detroit, Mich., assignors to Briggs Manufacturing Co., Detroit, Mich., a corporation of Michigan Application February 21, 1952, Serial No. 272,814

11 Claims. (Cl. 154—106)

This invention relates generally to articles, such as trim panels, formed of layers or laminations of sheet material bonded together, and is particularly useful in connection with panels utilized for trimming the interiors of automobile or vehicle bodies, especially the doors thereof.

In the fabrication of trim panels for automobile doors it is frequently the practice to upholster the major upper area of the panel with a fabric, cloth or other attractive material and an underlying layer of padding material. Below this main upholstered area the panel is provided with a relatively narrow upholstered area, frequently termed a kick-pad, which lies near the bottom of the door and is usually covered with a layer of more durable material, such as imitation leather, carpeting, fabric or synthetic material which often is of different color or appearance than the main upper upholstered area. In accordance with conventional practice the juncture between the upper and lower upholstered areas of the panel is closed by means of an ornamental metallic molding which extends transversely of the door from one side edge to the other of the panel.

In the manufacture of many types of door trim panels it has been the custom to consolidate together in a press under heat and pressure the several laminations or layers of the panel along ornamental bonding lines. In some instances the metal moldings are secured in place by a bonding operation in the press. In other instances the metal moldings are applied and attached in place after the panel laminations have been bonded together in the press. The latter type of metal molding usually is provided with prongs which are passed through holes pierced in the panel and clinched over the back face thereof.

The fabrication of the metal moldings and the use thereof on the trim panels enhance the cost of the panels, and this is particularly true in respect to metal moldings of the clinch-on type above referred to which are not only expensive to make but require costly time consuming operations in the installation thereof.

A primary object of the present invention is to eliminate the use of metal moldings, especially to close or cover the juncture between distinct upholstered or trimmed areas of the panel, and to form by a bonding operation in the press a simulated molding along the juncture of these areas from the covering trim materials of the panel.

In the illustrated embodiment of the invention the trim panel is divided into a main upper area and a relatively narrow lower or kick-pad area, these areas being preferably distinct by the use of different covering or trim materials. A relatively stiff foundation layer overlaid with a padding layer is preferably common to the two areas of the panel. Along the eventual line of juncture between these areas a strip or layer of bonding material may be interposed between the padding and foundation layers. The covering layers for the upper and lower areas of the panel are placed in superimposed relation upon the padding layer and held in place thereon in any suitable manner, such as by stapling. A strip of bonding material may then be placed upon the superimposed edge portions of the covering layers along the eventual line of juncture between the panel areas. This strip may be anchored in place and preferably is such as to form a breaker or straight edge across which the upper covering layer may be neatly folded back so as to cover one area, such as the lower kick-pad area, of the panel. With the layers arranged and assembled as above described they are introduced into the press and bonded together. By means of a die of desired contour the various layers are pressed and bonded together along the juncture between the upper and lower panel areas so as to provide an integral ornamental strip extending transversely from one side edge to the other of the panel which is effective in simulating a molding while providing a permanent joint or union between the covering materials for the panel areas as well as between the covering materials and the underlying padding and foundation layers.

Other objects of this invention will appear in the following description and appended claims, reference being had to the accompanying drawings forming a part of this specification wherein like reference characters designate corresponding parts in the several views.

Fig. 1 is a plan view of a trim panel constructed in accordance with one embodiment of the present invention.

Fig. 2 is an enlarged fragmentary section taken substantially through lines 2—2 of Fig. 1 looking in the direction of the arrows.

Figs. 3, 4, 5, 6, 7 and 8 are enlarged fragmentary sections taken in part along lines 2—2 of Fig. 1 and illustrating successive steps in assembling the several layers or sheets and bonding strips of the trim panel preparatory to the introduction of the assembly into a press for carrying out the bonding operation under the influence of heat and pressure.

Figure 6:
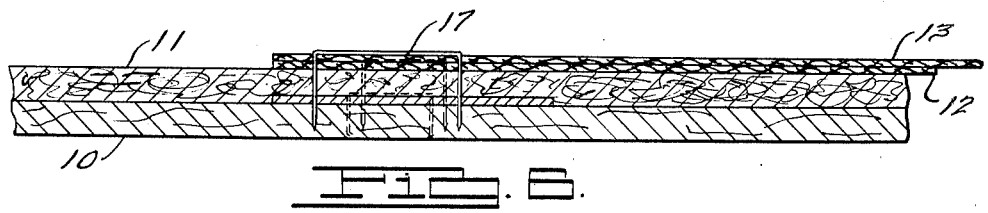

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

For the purpose of illustrating one manner in which the invention may be utilized, there is illustrated in Fig. 1, by way of example, a trim panel of the type which may be used as a finish trim on the inside of an automobile body, such as on the door thereof. The illustrated trim panel is fabricated so as to provide a main upper area A covered with a trim material and a lower rather narrower area B, often termed a kick-pad, which is also covered with a trim material. In the present instance the areas A and B of the trim panel are upholstered, having an underlying layer or sheet of padding or wadding material which is supported upon a foundation layer or sheet. The trim material forming the top sheet covering the area A may be of any suitable kind. Examples of such material are fabric, cloth or synthetic material, such as vinyl acetate. The lower kick-pad area B of the panel is usually covered with a layer of more durable material, such as carpeting, imitation leather or other synthetic material, or a layer of fabric of different color, appearance or characteristics than the upper covering layer for the area A. The covering layers of trim material for the areas A and B are overlapped along a relatively narrow area of juncture C extending from one side edge of the panel to the other and are bonded together under heat and pressure within the area C, as hereinafter described.

The trim panel made in accordance with the present embodiment of the invention comprises a stiff foundation board 10, preferably of compressed fibrous material, and a layer of padding or wadding 11 superimposed upon the foundation board or sheet 10. The wadding or padding layer 11 comprises any suitable soft deformable material capable of being employed for cushioning the outer surface of the panel. Cotton batting or multiple layers of crepe paper may be used satisfactorily for this purpose, and in the preferred embodiment a single layer or sheet of padding 11 is provided which is coextensive with the foundation sheet 10. The trim panel also comprises a top sheet or outer covering layer 12 of trim material which covers the upper area A of the panel, and a narrower top sheet or outer covering layer 13 of trim material which covers the lower or kick-pad B of the panel.

The various steps of laying up or assembling the component parts of the trim panel are illustrated in Figs. 3 to 8 inclusive. As shown in Fig. 3, a relatively narrow strip of material 14 treated with a bonding substance is placed upon the foundation sheet 10 along the eventual line of juncture between the areas A and B, this strip extending the full width of the panel and being preferably anchored or secured in place by stapling it at a suitable number of points as shown at 15 to the foundation sheet 10. Thereupon as illustrated in Fig. 4, the sheet or layer 11 of padding material is placed upon the foundation sheet so as to cover the entire area thereof.

Figure 7:
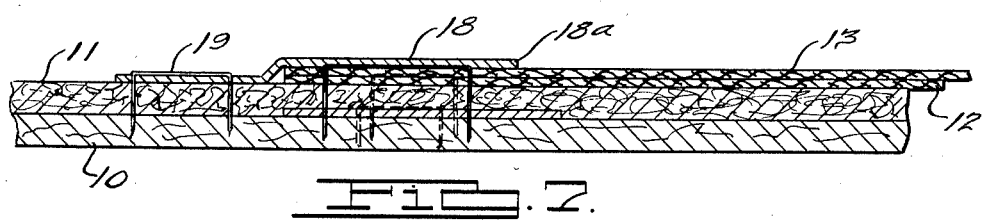

In accordance with the next step in assembling the component parts of the panel as shown in Fig. 5, the top sheet 12 is placed upon the padding sheet 11 so as to cover the upper area thereof corresponding to the area A of the panel. As shown in Fig. 5, the lower transverse edge portion of the top sheet 12 is positioned so as to overlie the treated strip 14, and if desired the sheet 12 may be held in its proper place by stapling it at a suitable number of points, as shown at 16, to the padding layer 11 and the foundation sheet 10. The top sheet 13, which eventually covers the kick-pad area B is then superimposed upon the top sheet 12 in the manner illustrated in Fig. 6. At this stage in the assembly of the materials, as shown in Figs. 6 and 7, the top sheet 13 overlies the sheet 12 in the region of the upper area A of the panel and the lower edge of sheet 13 coincides with or is disposed approximately at the lower edge of the sheet 12. The lower superimposed edge portions of the sheets 12 and 13, as shown in Fig. 6, thus overlie the padding layer 11 as well as the treated strip 14 and extend the full width of the panel. If desired, the sheets 12 and 13 may be anchored in their proper positions by stapling them at a suitable number of points, as shown at 17, to the padding layer 11 and foundation sheet 10. It will be understood that the staples 16 may be omitted and a single row of staples 17 employed for attaching both sheets 12 and 13 in their proper positions with respect to the padding and foundation sheets.

In accordance with the next step in laying up or assembling the component parts of the panel, as shown in Fig. 7, a strip of material 18 treated with a bonding substance is placed in position so that a portion thereof overlies the lower edge portions of the top sheets 12 and 13. This strip 18 extends the full width of the panel and is preferably of a width so that a portion thereof extends beyond the corresponding edges of the sheets 12 and 13 and lies directly against the padding layer 11. The strip 18 is anchored firmly in place by stapling it at a suitable number of points, as shown at 19, to the padding layer 11 and foundation sheet 10. The treated strip 18, when positioned and secured in place, as illustrated in Fig. 7, provides a breaker or straight edge 18a extending transversely of the panel the full width thereof, this edge providing a folding line for the trim material 13.

Figure 8:
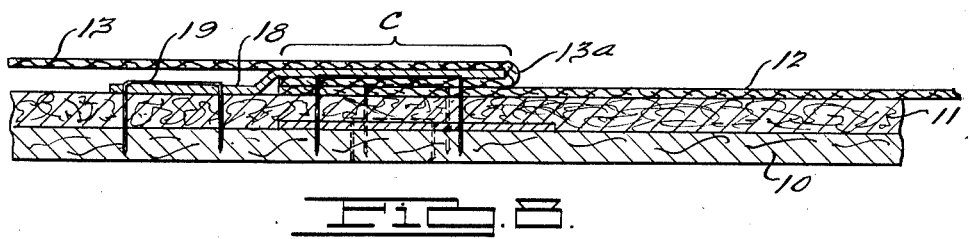

After the materials have been assembled in the manner shown in Fig. 7, the top sheet 13 is folded back so as to cover the lower area B of the panel, as illustrated in Fig. 8. The sheet 13 is folded back firmly against the edge 18a of the treated strip 18, thus providing a folded edge 13a extending along and parallel to the straight edge 18a of the strip 18. After the sheet 13 has been folded back in the manner shown in Fig. 8 there is provided a portion of this sheet which overlies and directly contacts a portion of the strip 18 which in turn overlies the lower edge portions of the top sheets 12 and 13. Hence, within the area indicated at C in Fig. 8 the top sheets 12 and 13 and the strip 18 provide four superimposed layers of material.

Figure 9:
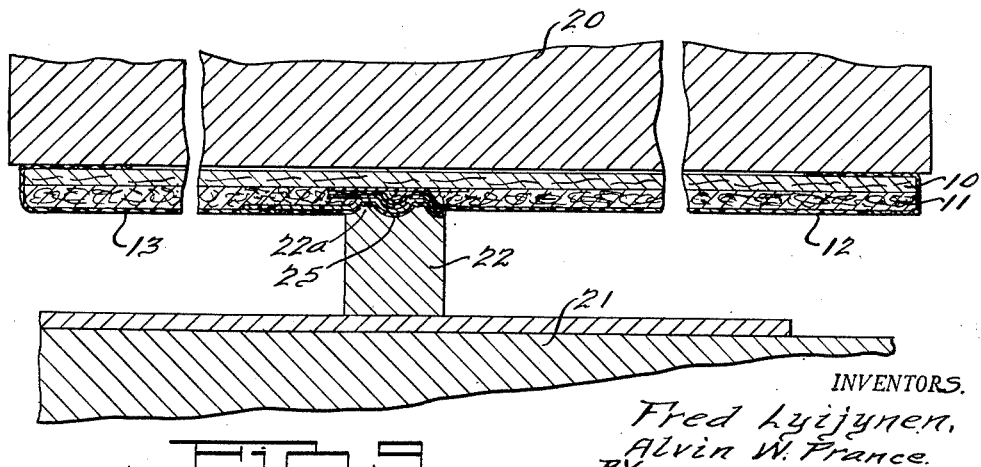
Fig. 9 is a fragmentary sectional view illustrating the operation of bonding or consolidating together in a press the component parts of the assembly illustrated in Fig. 8.

The component parts of the panel, after being assembled in the manner shown in Fig. 8, are introduced into a press, such as a hydraulic press having the usual upper and lower heated platens 20 and 21. As shown in Fig. 9, the panel assembly is introduced in inverted position into the press. Carried by the lower platen 21 is a transverse die bar or member 22 having its upper working surface 22a suitably contoured and contacting the top sheet 13 within the area C. When the press is closed the component parts of the panel in the area C are consolidated or bonded together under heat and pressure. The die 22 may be contoured at 22a to produce any desired design or pattern in the area C along the juncture of the top sheets A and B. One suitable pattern is illustrated in Fig. 2 wherein the die has produced spaced parallel relatively deep indentations or grooves 23 and 24 with an intervening rounded bead 25 extending between the grooves the full width of the panel. The folded edge 13a of the sheet 13 is displaced by the die so as to protrude slightly somewhat above the plane of the area A and at this locality the folded edge portion of the sheet 13 as well as the corresponding edge portion of the strip 18 is displaced so as to extend in an inclined fashion. Thus, a smooth rounded edge 26 is produced together with ornamental grooves 23, 24 and an intervening rounded bead 25, resulting not only in a permanent bond of the materials at these localities but a stiff or rigid narrow area C extending across the panel which in effect simulates a molding.

The laminations or sheets 10, 11 and 12 may also be consolidated or bonded together within the area A of the panel along ornamental lines defined by relatively deep indentations or grooves 27 and 28 similar to the grooves 23 and 24. A suitable bonding material, similar to the material with which the strips 14 and 18 are treated, may be applied to the padding layer in the regions in which the ornamental grooves 27 and 28 are formed. These grooves are produced by die bars or members carried by the lower platen 21 of the press.

The resinous or bonding material used for consolidating together the laminations of the trim panel within the area C is contained in the treated strips 14 and 18. Each of these strips may comprise a low density absorbent strip of cellulosic material, such as alpha cellulose or pulp paper, which is not only highly absorbent but also compressible under the action of the die during the hot pressing operation. The strips are treated or impregnated with a bonding substance effective to form a bond under heat and pressure. The bonding substance may be a thermoplastic or thermosetting resin, such as a phenol formaldehyde or a urea formaldehyde resin, these being commonly termed phenolic resins. Where a resin of this character is used as the bonding agent it is preferable to convert the resinous substance into a varnish by dissolving it in a suitable volatile solvent. The strips 14 and 18 may be impregnated by immersion and saturation in the varnish. By controlling the percentage of resin contained in the varnish the desired amount of resin introduced into the strips may be readily controlled in order to produce the desired bonding action without the presence of excess resin. After impregnation the strips 14 and 18 are treated to expel the volatile solvents, the resinous material remaining in the strips being partially reacted or polymerized or cured so as to be capable of further reaction or curing when subjected to heat from the heated platens or dies during the press operation. During the press operation the temperature and pressure are regulated so that the resinous material in the treated strips is cured or brought to substantially a final stage of reaction or polymerization. As a consequence, the layers of the panel are permanently bonded together when the panel is removed from the press.

I claim:
1. A laminated panel comprising a foundation sheet, a padding sheet overlying said foundation sheet, a top sheet of trim material covering an upper area of said panel and a second top sheet of trim material covering a lower area of said panel, said top sheets having overlapping edge portions along the juncture of said area with one edge portion of one top sheet superimposed upon the other edge portion of the other top sheet, a strip of material treated with a bonding substance overlying said edge portions, said one top sheet being folded around an edge of said strip and overlying the same, said top sheets being bonded together and to the padding sheet in the region of said edge portions through the medium of said bonding substance.

2. A laminated panel comprising a foundation sheet, a padding sheet overlying said foundation sheet, a top sheet of trim material covering an upper area of said panel and a second top sheet of trim material covering a lower area of said panel, said top sheets having overlapping edge portions along the juncture of said area with one edge portion superimposed upon the other edge portion, a strip of material treated with a bonding substance overlying said edge portions, said second top sheet being folded back upon said strip to cover the same, and said top sheets being bonded together in the region of said edge portions through the medium of said bonding substance.

3. A laminated panel comprising a foundation sheet, a padding sheet overlying said foundation sheet, a top sheet of trim material covering an upper area of said panel and a second top sheet of trim material covering a lower area of said panel, said top sheets having overlapping edge portions along the juncture of said area with one edge portion of one top sheet superimposed upon the other edge portion of the other top sheet, a layer of bonding material associated with said edge portions, said one top sheet being folded back to provide a portion overlying said edge portions, all of said portions being bonded together under heat and pressure through the medium of said bonding material.

4. A laminated panel comprising a foundation sheet, a padding sheet overlying said foundation sheet, a top sheet of trim material covering an upper area of said panel and a second top sheet of trim material covering a lower area of said panel, said top sheets having overlapping edge portions along the juncture of said area with one edge portion superimposed upon the other edge portion, a layer of bonding material overlying said edge portions, said second top sheet being folded back to provide a portion covering said layer, all of said portions being bonded together under heat and pressure through the medium of said bonding material.

5. A laminated panel comprising a support including a padding layer, a top sheet of trim material covering one area of said layer, a second top sheet of trim material covering another area of said layer, said top sheets in a region of juncture thereof having overlapping edge portions overlying said padding layer, a strip of material treated with a bonding substance secured to said support and overlying said edge portions, said strip providing a straight edge, one of said top sheets being folded back to cover said strip with the line of folding of the sheet extending along and parallel to said straight edge, said sheets being bonded together in the region of said edge portions through the medium of said bonding substance.

6. A laminated panel comprising a support including a padding layer, a top sheet of trim material covering one area of said layer, a second top sheet of trim material covering another area of said layer, said top sheets in a region of juncture thereof having overlapping edge portions overlying said padding layer, a strip of material treated with a bonding substance secured to said support and overlying said edge portions, said strip providing a straight edge, one of said top sheets being folded back against said straight edge to provide a portion overlying the strip and said edge portions, said portions and strip being bonded together under heat and pressure through the medium of said bonding substance.

7. A laminated panel comprising a foundation sheet, a padding sheet overlying said foundation sheet, a top sheet of trim material covering an upper area of said panel and a second top sheet of trim material covering a lower area of said panel, said top sheets having overlapping edge portions along the juncture of said area with one edge portion superimposed upon the other edge portion, a strip of material treated with a bonding substance interposed between the foundation and padding sheets at the region of said juncture, a second strip of material treated with a bonding substance overlying said edge portions, one of said top sheets being folded back along an edge of said second strip to provide a portion overlying said strips and edge portions, said portions and sheets being bonded together under heat and pressure through the medium of said bonding substances.

8. The method of forming a laminated panel having a foundation sheet and a padding sheet overlying the same, including the steps of placing two top sheets of trim material in superimposed relation upon said padding sheet to cover one area thereof, placing a strip of material treated with a bonding substance over adjacent corresponding edge portions of said top sheets, folding the upper of said top sheets back along an edge of said strip to cover a second area of said padding sheet while providing a portion covering said strip, and bonding said portions of the sheets to said padding and foundation sheets under heat and pressure.

9. The method of forming a laminated panel having a foundation sheet and a padding sheet overlying the same, including the steps of placing two top sheets of trim material in superimposed relation upon said padding sheet to cover one area thereof, placing a strip of material treated with a bonding substance over adjacent corresponding edge portions of said top sheets, folding the upper of said top sheets back against an edge of said strip to cover a second area of said padding sheet while providing a portion covering said strip, and applying heat and pressure to bond together said portions of the top sheets, said strip and an underlying portion of the padding sheet through the medium of said bonding substance.

10. The method of forming a laminated panel having a support including a layer of padding material, including the steps of arranging two top sheets of trim material in superimposed relation upon said padding layer to cover one area thereof with corresponding edge portions of the sheets disposed adjacent each other, placing a strip of material treated with a bonding substance in associated relationship to said edge portions with a portion of said strip extending beyond said edge portions and securing to said support, folding the upper of said top sheets back along a predetermined fold line to cover a second area of said padding layer while providing a portion overlying said strip and edge portions, and applying heat and pressure to bond together said portions of the sheets, said strip and an underlying portion of said padding layer.

11. The method of forming a laminated panel having a support including a layer of padding material, including the steps of arranging two top sheets of trim material in superimposed relation upon said padding layer to cover one area thereof with corresponding edge portions of the sheets disposed adjacent each other, placing a strip of material treated with a bonding substance in associated relationship to said edge portions with a portion of said strip extending beyond said edge portions and secured to said support, folding the upper of said top sheets back along a fold line corresponding to an edge of said strip to cover a second area of said padding layer while providing a portion overlying said strip and edge portions, and applying heat and pressure to bond together said portions of the sheets, said strip and an underlying portion of said padding layer through the medium of said bonding substance.

References Cited in the file of this patent

UNITED STATES PATENTS

| Number | Name | Date |
|---|---|---|
| 2,202,977 | Woodall | June 4, 1940 |
| 2,303,195 | Buff | Nov. 24, 1942 |
| 2,338,490 | Cunnington | Jan. 4, 1944 |
| 2,341,978 | Cunnington | Feb. 15, 1944 |
| 2,347,806 | Bolen et al. | May 2, 1944 |
| 2,465,374 | Haman et al. | Mar. 29, 1949 |
| 2,581,195 | Lyijynen | Jan. 1, 1952 |